UNITED STATES PATENT OFFICE.

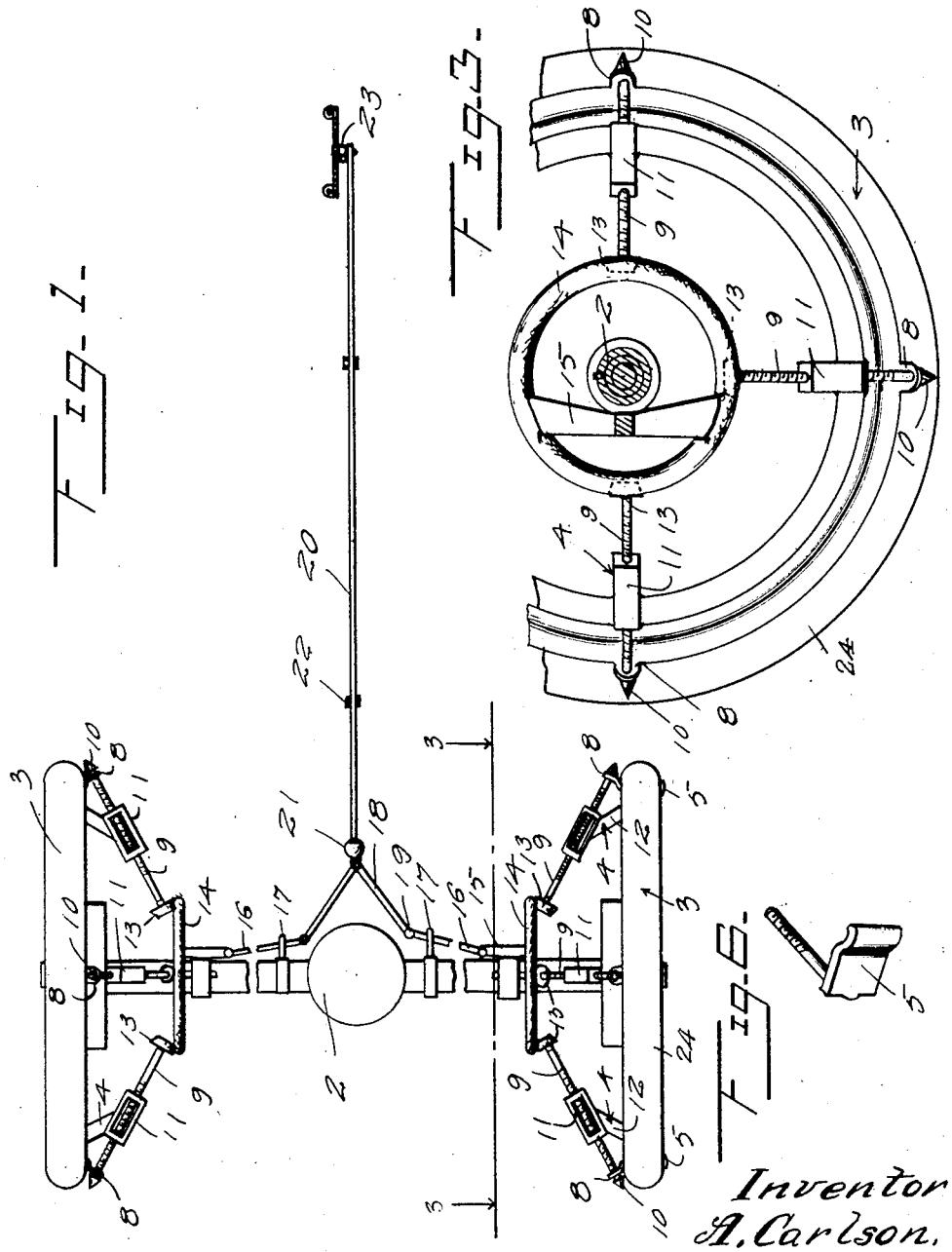

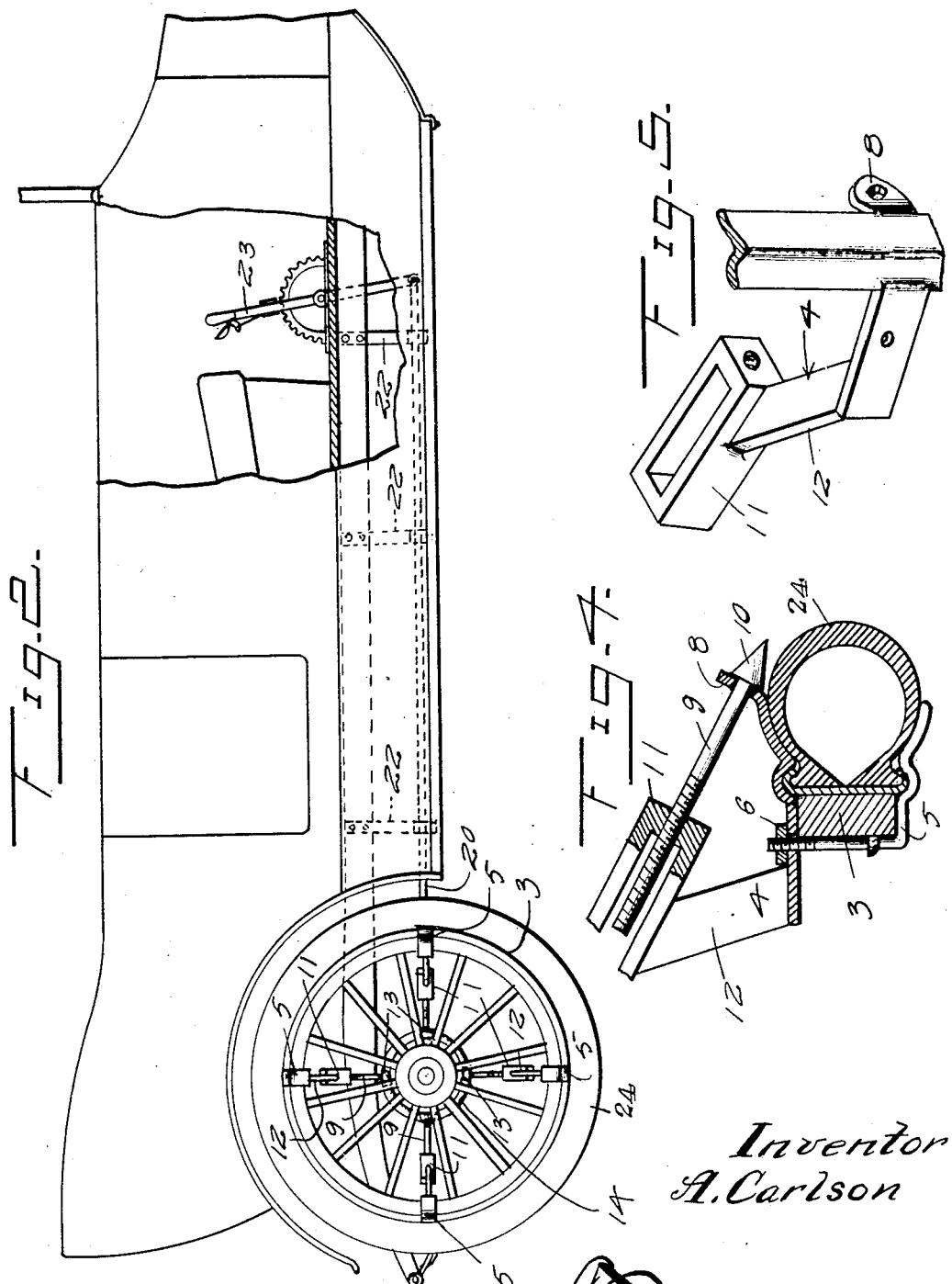

AUGUST CARLSON, OF DELL RAPIDS, SOUTH DAKOTA.

AUTOMOBILE-WHEEL NON-SKID DEVICE.

1,396,556.     Specification of Letters Patent.     Patented Nov. 8, 1921.

Application filed April 28, 1920. Serial No. 377,332.

*To all whom it may concern:*

Be it known that I, AUGUST CARLSON, a citizen of the United States, residing at Dell Rapids, in the county of Minnehaha and State of South Dakota, have invented certain new and useful Improvements in Automobile-Wheel Non-Skid Devices; and I do hereby declare the following to be a full, clear, and exact description of the invention, such as will enable others skilled in the art to which it appertains to make and use the same.

This invention relates to new and useful improvements in non-skid devices for automobile wheels and has for its primary object the provision of non-skid members carried by a wheel and adapted to be automatically moved outwardly of the tread of the wheel or its tire and under manual control, so as to obviate the wheel skidding or rotating without obtaining traction.

Another object of this invention is the provision of supporting means for the non-skid members adapted to cause them to move inwardly and outwardly according to the direction in which they are rotated.

A further object of this invention is the provision of manual control means adapted to be moved to contact with said non-skid members for causing them to rotate and extend themselves for engagement with the ground whenever there is danger of skidding.

A still further object of this invention is the provision of a non-skid device for automobile wheels of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts, as will be hereinafter more fully described and claimed.

For a complete understanding of my invention, reference is to be had to the following description and accompanying drawings, in which:—

Figure 1 is a plan view, illustrating a non-skid device for automobile wheels constructed in accordance with my invention.

Fig. 2 is a side elevation, illustrating the same.

Fig. 3 is a sectional view taken on the line 3—3 of Fig. 1.

Fig. 4 is an enlarged detail sectional view illustrating one of the non-skid members and its support.

Fig. 5 is a detailed perspective view illustrating a supporting sleeve.

Fig. 6 is a similar view illustrating a clamp.

Referring in detail to the drawings, the numeral 1 indicates as an entirety an automobile having the usual rear axle housing 2 and rear wheels 3 to which my invention is applied.

A plurality of brackets 4 are detachably secured to the inner side of the wheels 3 by means of clamps 5 that engage the rim or felly and are adjustably secured to said brackets by nuts 6. The brackets 4 are arranged at spaced intervals about the wheel and are connected together and include arms 8 which slidably receive the outer ends of rods 9. The outer ends of the rods 9 have formed thereon heads 10 preferably of arrow head shape so that when contacting with the ground or pavement, they will bite into the same and prevent the wheel 3 from skidding or rotating without obtaining traction. The rods 9 are screw threaded and are threaded in internally threaded sleeves 11 carried by arms 12 of the brackets 4. The rods 9 are supported at an incline in relation to the wheel 3 and their inner ends have formed thereon conical elements 13 as shown in Fig. 1.

A disk 14 is slidably mounted on the housing 2 adjacent the wheel and is held against rotation and has connected thereto a forked member 15 which is in turn connected to a rod 16 which is slidably mounted in brackets 17 carried by the housing.

A rod 18 is connected to the end of the rod 16 by a universal joint 19 and the other end of the rod 18 is connected to a rod 20 by a universal joint 21. The rod 20 is supported by the frame or body of the automobile through brackets 22 and said rod has its forward end connected to a pivoted lever 23 that is located in convenient reach of the operator of the automobile so that upon pulling on said lever, the disk 14 will be moved into engagement with the conical elements and on rotation of the wheel 3, the conical elements move about the disk and rotate the rods and owing to their threaded connection with the sleeves 11 will cause said rods to move outwardly or extend themselves beyond the tire 24 on the wheel so that they will engage and bite into the ground to prevent skidding or slipping. After the rods 4 have been extended and it is desired to move them inwardly, the wheel 3 is rotated in a reverse direction when the conical elements 13 are in contact with the disk 14.

It is to be understood that the same construction can be reproduced on the other rear wheel of the automobile and controlled by the lever 23 if desired.

While I have shown and described the preferred embodiment of my invention, it will be understood that minor changes in construction, combination, and arrangement of parts may be made without departing from the spirit and scope of the invention as claimed.

Having thus described my invention, what I claim is:

1. A device of the character set forth including an axle housing and a wheel, a plurality of brackets carried by said wheel, non-skid elements threaded to said brackets, and manually controlled means adapted to engage said non-skid elements to cause them to extend themselves by the rotation of the wheel.

2. A device of the character set forth including an axle housing and a wheel, brackets detachably secured to said wheel, internally threaded sleeves carried by said brackets, non-skid elements threaded in said sleeves, and manually controlled means adapted to be moved in engagement with the non-skid elements to cause them to extend themselves on rotation of the wheel.

3. A device of the character set forth including an axle housing and a wheel, brackets detachably secured to said wheel, internally threaded sleeves carried by said brackets, rods threaded in said sleeves, calks carried by one of the ends of said rods, spherical members formed on the other ends of said rods, and manually controlled means adapted to be moved in engagement with the spherical members to cause rotation of said rods on rotation of the wheel.

4. A device of the character set forth including an axle housing and a wheel, internally threaded sleeves detachably secured to the wheel, rods threaded in said sleeves, calks carried by said rods, conical elements formed on said rods, a disk slidably secured to the axle housing, means moving the disk into and out of engagement with the conical elements.

5. A device of the character set forth including an axle housing and a wheel, non-skid elements detachably and rotatably connected to said wheel, conical elements formed on the non-skid elements, a disk slidably secured to the axle housing, rods connected to said disk, and a lever connected to said rods for moving the disk into and out of engagement with the conical elements.

In testimony whereof I affix my signature in presence of two witnesses.

AUGUST CARLSON.

Witnesses:
OLUF HEGGE,
EDGAR J. ELLIOTT.